US010152026B2

(12) United States Patent
Godat et al.

(10) Patent No.: US 10,152,026 B2
(45) Date of Patent: Dec. 11, 2018

(54) SHOCK DETECTOR CIRCUIT

(71) Applicant: EM Microelectronic-Marin SA, Marin (CH)

(72) Inventors: Yves Godat, Cornaux (CH); Nicolas Jeannet, Chambrelien (CH)

(73) Assignee: EM Microelectronic-Marin SA, Marin (CH)

( * ) Notice: Subject to any disclaimer, the term of this patent is extended or adjusted under 35 U.S.C. 154(b) by 110 days.

(21) Appl. No.: 15/507,373

(22) PCT Filed: Sep. 3, 2015

(86) PCT No.: PCT/EP2015/070182
§ 371 (c)(1),
(2) Date: Feb. 28, 2017

(87) PCT Pub. No.: WO2016/034685
PCT Pub. Date: Mar. 10, 2016

(65) Prior Publication Data
US 2017/0285577 A1    Oct. 5, 2017

(30) Foreign Application Priority Data
Sep. 5, 2014    (EP) .................................... 14183786

(51) Int. Cl.
*H02P 8/02* (2006.01)
*G04C 3/14* (2006.01)
*G01P 15/00* (2006.01)

(52) U.S. Cl.
CPC .............. *G04C 3/143* (2013.01); *H02P 8/02* (2013.01); *G01P 15/00* (2013.01)

(58) Field of Classification Search
CPC ........................................................ H02P 8/02
(Continued)

(56) References Cited

U.S. PATENT DOCUMENTS 4,321,519 A   3/1982 Ueda et al.
4,651,266 A * 3/1987 Fujioka ................ H02M 1/14
                                                   363/126

(Continued)

FOREIGN PATENT DOCUMENTS

EP    1 693 720 A1    8/2006
EP    2 249 214 A1   11/2010
FR    2 426 999 A1   12/1979

OTHER PUBLICATIONS

International Search Report dated Mar. 10, 2016 in PCT/EP2015/070182 filed Sep. 3, 2015.

*Primary Examiner* — David S Luo
(74) *Attorney, Agent, or Firm* — Oblon, McClelland, Maier & Neustadt, L.L.P.

(57) ABSTRACT

An electronic device including: a calculation unit configured to generate a signal representative of a physical magnitude, for a motor driving a display device, the motor including two terminals, one positive and one negative, via which the calculation unit controls the motor; at least one shock detection circuit connected between the calculation unit and one terminal of the motor for detection of an external shock applied to the motor. The shock detection circuit includes a comparison part comparing an induced voltage generated in the motor following a shock to a predetermined reference voltage to identify a shock, and a selection part.

6 Claims, 4 Drawing Sheets

(58) Field of Classification Search
USPC .................................................. 318/685, 671
See application file for complete search history.

(56) References Cited

U.S. PATENT DOCUMENTS

| | | |
|---|---|---|
| 2007/0115760 A1 | 5/2007 | Kitazawa et al. |
| 2011/0013494 A1 | 1/2011 | Sato et al. |
| 2014/0239874 A1 | 8/2014 | Inoue |

* cited by examiner

SHOCK DETECTOR CIRCUIT

The present invention concerns an electronic device comprising a calculation unit capable of generating a signal representative of a physical magnitude, for a motor driving a display device, said motor comprising two terminals, one positive and one negative, via which the calculation unit controls the motor, the electronic device further comprising at least one shock detector circuit connected between the calculation unit and one motor terminal for the detection of an external shock applied to the motor.

BACKGROUND OF THE INVENTION

There are known timepieces comprising a case inside which an electromechanical timepiece movement is arranged. Such a movement is clocked by a quartz oscillator system. For the display of time indications, such as the hour and second, hands are mounted on motors to be driven in rotation. The motors used are Lavet type motors, also called stepping motors. In these motors, a magnetically charged rotor of cylindrical shape creates a radial magnetic field in the air gap of a magnetic circuit, on which is wound a coil whose terminals are connected to a control circuit, generally an integrated circuit, supplying current pulses, each pulse causing the rotor to advance one step. The coil is formed by a very fine wire, wound on a hollow, insulating tube containing therein one part of the magnetic circuit.

These motors, located inside the watch, are subjected to shocks which may be caused by the watch being dropped or by violent movements of the user. These shocks are then likely to disrupt the operation of the motors. These disruptions consist of an uncontrolled movement of the rotor or rotors whereby their inertia causes the skipping of at least one step.

Consequently, the time indications provided by the hands are likely to no longer be accurate.

To overcome this, there exist shock detector systems. An electronic device is therefore responsible for measuring the tension induced by the motor during a shock. Indeed, an induced voltage is generated under the effect of the inertia of the rotor. This induced voltage is detected by a detector circuit which compares the induced voltage to a predetermined threshold. If the voltage is higher than said threshold, the detector circuit deduces that a shock has occurred and transmits the information to a control unit.

In response to the shock, the control unit sends the motor a blocking pulse used to block any rotation of the rotor caused by the shock.

However, a regulated voltage inverter is used to measure the induced voltage. To increase sensitivity, the motor coil is short-circuited for a short instant thereby increasing the voltage at the motor coil terminals as a result of the self-induction effect of the motor $delta(U)=L*(di/dt)$ and the current automatically increases. This increase may cause damage to appear.

SUMMARY OF THE INVENTION

It is an object of the invention to overcome the drawbacks of the prior art by proposing to provide a shock detector device for a motor allowing the detection of a shock in a faster and more accurate manner.

To this end, the present invention concerns an electronic device comprising a calculation unit capable of generating a signal representative of a physical magnitude, for a motor driving a display device, said motor comprising two terminals, one positive and one negative, via which the calculation unit controls the motor, the electronic device further comprising at least one shock detector circuit connected between the calculation unit and one motor terminal for the detection of an external shock applied to the motor, characterized in that the shock detection circuit includes a comparison part for comparing an induced voltage generated in the motor following a shock to a predetermined reference voltage in order to identify a shock, the detection circuit further comprising a selection part for varying the induced voltage to improve the sensitivity of said shock detector circuit.

One advantage of this invention is that it allows the detection of positive or negative levels.

In a first advantageous embodiment, the electronic device comprises two shock detection circuits each connected between the calculation unit and a terminal of the motor for detection of an external shock applied to the motor, one shock detection circuit being connected to the positive terminal whereas the other is connected to the negative terminal.

In a second advantageous embodiment, the comparison part comprises a comparator provided with a positive input and a negative input, the selection part comprising a series of series connected resistors Ri, the first of these resistors being connected to the motor connection terminal whereas the last resistor of the series is connected to earth, the selection part further comprising a selector including an output connected to the positive input of the comparison part and a plurality of selection points pi, each connected to one resistor Ri.

In a third advantageous embodiment, the selection part further comprises an activation transistor in series with the series of resistors (Ri) for activating or deactivating said shock detection circuit.

In another advantageous embodiment, the predetermined reference voltage is connected to the negative terminal of the comparison part.

In another advantageous embodiment, the predetermined reference voltage is negative or positive.

In another advantageous embodiment, the comparison part comprises a first pair and a second pair of series connected transistors, each pair comprising one p-type transistor and one n-type transistor, the gates of transistors of the same type being connected together, the gates of the p-type transistors being connected to a current source, the gate of the n-type transistor of the first pair being connected to its drain, the drains of the p-type transistors being connected to a supply voltage (Vdd), the source of the n-type transistor of the first pair being connected to the output of the selection part, whereas the drain of the n-type transistor of the second pair is connected to earth.

BRIEF DESCRIPTION OF THE DRAWINGS

The objects, advantages and features of the invention will appear more clearly in the following detailed description of at least one embodiment of the invention, given solely by way of non-limiting example and illustrated by the annexed drawings, in which.

DETAILED DESCRIPTION

The present invention proceeds from the general idea of providing a shock detector device for a motor allowing the detection of a shock in a faster and more accurate manner.

Figure 1:
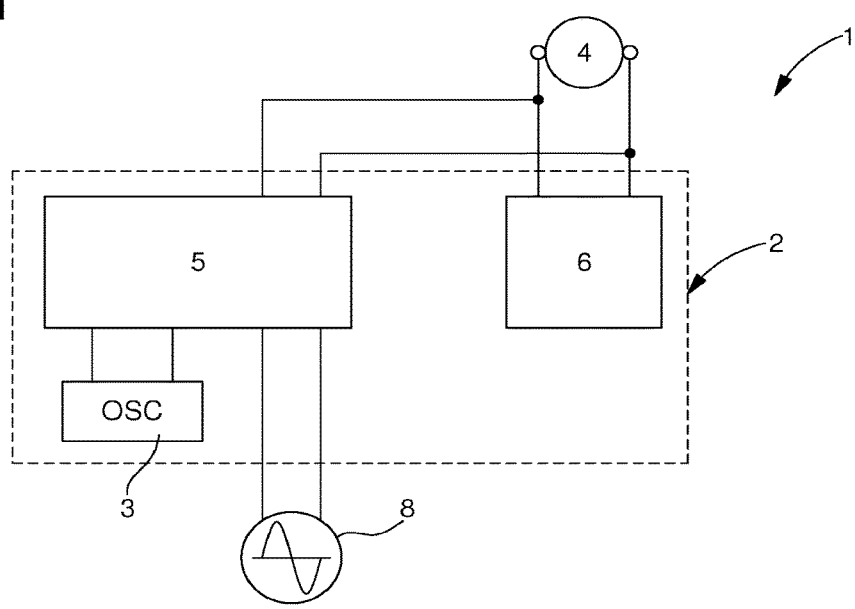
FIG. 1 shows a diagram of the electronic device according to the invention.

FIG. 1 represents a schematic view of an electronic movement. This movement or electronic device 1 comprises a control module 2 clocked by a quartz oscillator system 3. For the display of time indications, such as the hour and second, hands are mounted on motors 4 to be driven in rotation. The motors used are Lavet motors, also called stepping motors, and comprise two connection terminals Mot1 and Mot2. In these motors, a magnetically charged rotor 4a of cylindrical shape creates a radial magnetic field in the air gap of a magnetic circuit 4b, on which is wound a coil whose terminals are connected to the control module, generally an integrated circuit, supplying current pulses, each pulse causing the rotor to advance one step. The coil is formed by a very fine wire, wound on a hollow, insulating tube containing therein one part of the magnetic circuit. Control module 2 generally comprises a calculation unit 5. The assembly is powered by a power unit 8, such as a cell or battery. The power unit supplies a supply voltage Vdd. There is also an earth terminal Vss.

Figure 2:
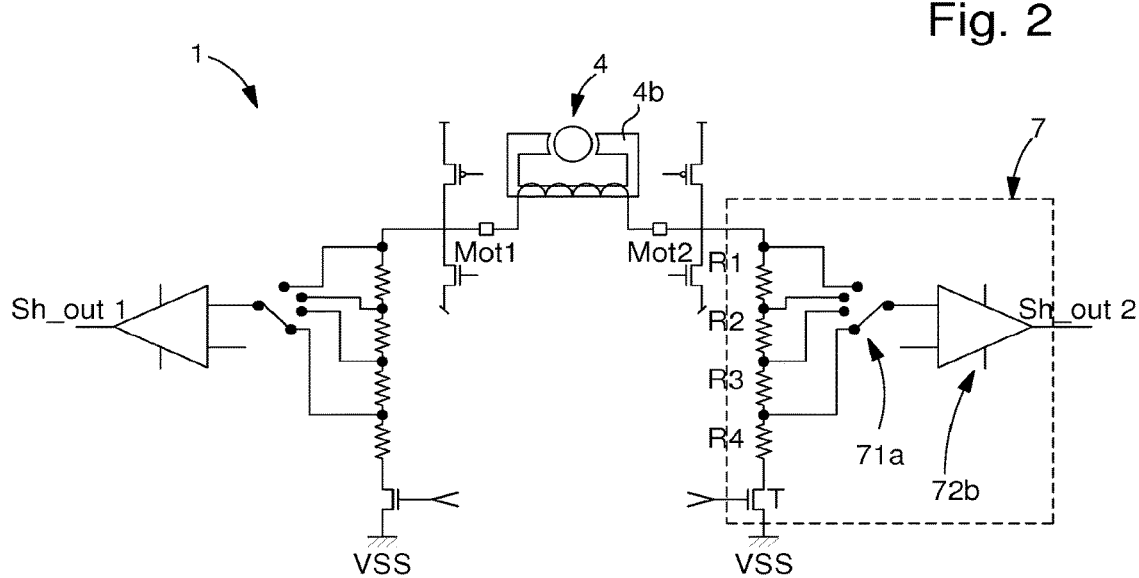
FIGS. 2 and 6 show a schematic view of the electronic device according to the invention.
Figure 6:
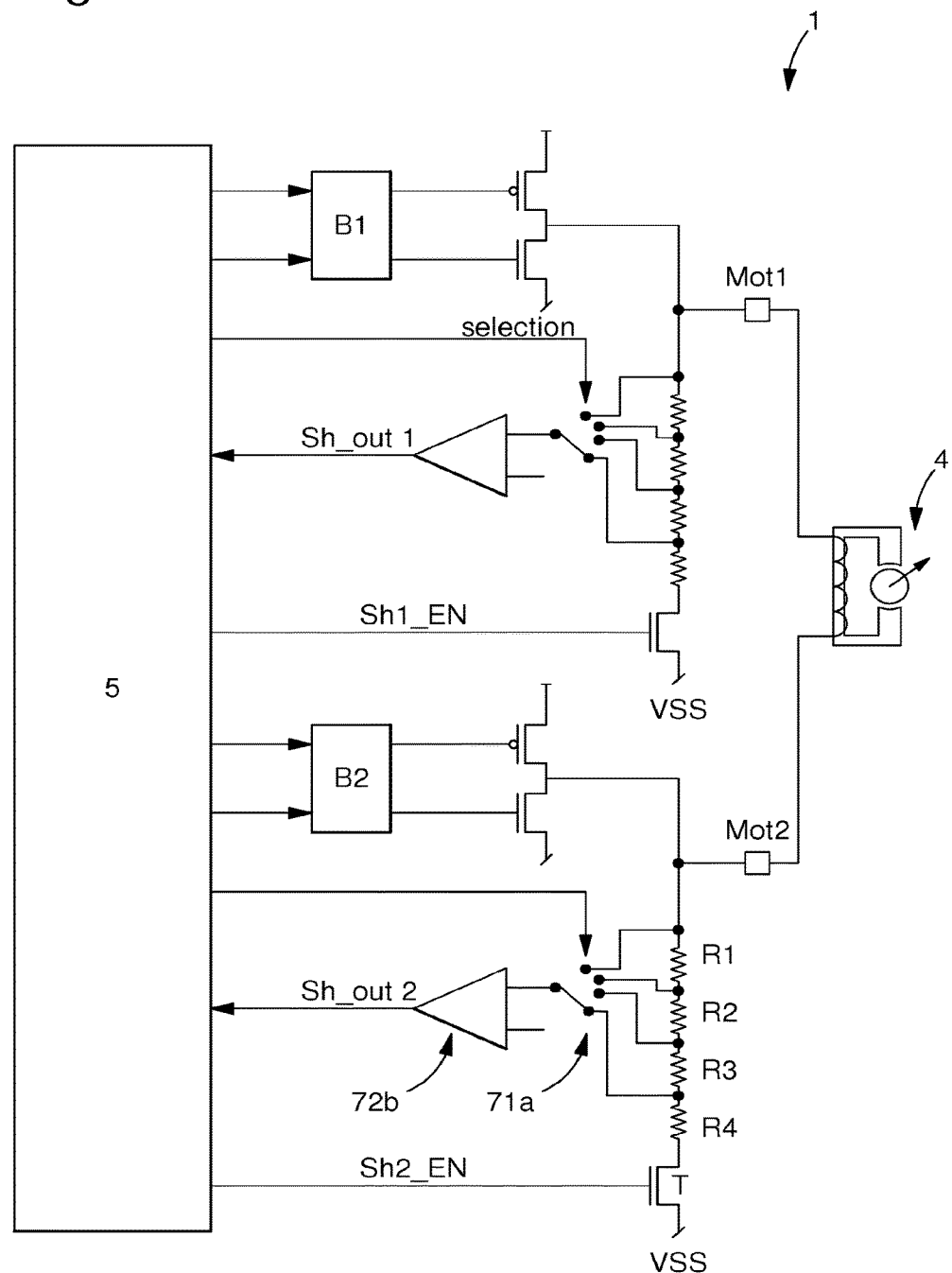

Advantageously according to the invention, control module 2, seen in FIG. 2, further comprises a detection unit 6 comprising at least one shock detector circuit 7. Shock detector circuit 7 is used to determine whether a shock has occurred. Thus, if a shock is detected, control module 2 can act accordingly and send a blocking pulse to prevent the rotor from starting to rotate. The shock detector circuit is placed at the output of at least one of the motor terminals. The following description will take the example of a shock detector circuit 7 connected to the negative terminal Mot2 of the motor. At each motor terminal Mot1, Mot2, a voltage Vmot is measured. At each terminal Mot1, Mot2, a motor buffer is arranged, these motor buffers comprise a flip-flop B1, B2 and two different types of series connected transistors, the gates of the transistors being connected to the flip-flop as seen in FIG. 6. The buffers are used to pass either a positive or a negative current through the motor coil in order to make it rotate.

In FIG. 2, it is noted that shock detector circuit 7 comprises a selection part 71 directly connected to terminal Mot2 of motor 4. This selection part 71 has an output connected to a comparison part 72. Comparison part 72 is connected to calculation unit 5 so as to provide the signal indicating whether or not a shock is detected.

Figure 3:
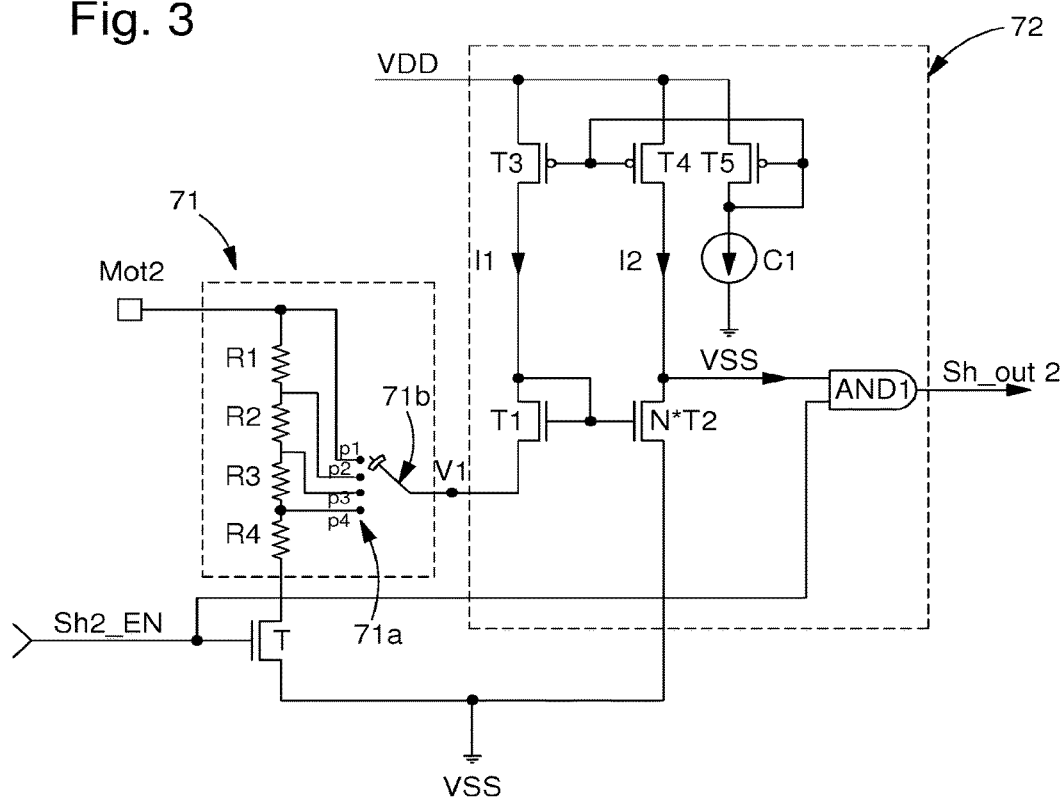
FIGS. 3 and 5 show a detailed view of a shock detector circuit according to the invention and one of its variants.

FIG. 3 shows a detailed diagram of the detection unit.

The selection part comprises a series of series connected resistors Ri. The first of these resistors Ri is connected to the connection terminal of motor 4, whereas the last resistor Ri of the series is connected to a terminal of a transistor T, more particularly to the drain thereof. The resistor series Ri will preferably include four resistors R1, R2, R3 and R4.

The source of this transistor T is connected to earth Vss and its gate is connected to calculation unit 5 of control module 2. Transistor T is used to activate or deactivate shock detection circuit 7. Indeed, depending on the voltage of a signal applied to the gate of this transistor, the latter will be open or closed. In the case where it is open, transistor T prevents shock detection circuit 7 from operating since the electrical circuit is open and vice versa. For the detection circuit connected to motor terminal Mot1, signal Sh1_EN will allow shock detection circuit 7 to be activated or deactivated. For the detection circuit connected to motor terminal Mot2, signal Sh2_EN will allow shock detection circuit 7 to be activated or deactivated.

Selection part 71 further comprises a selector 71a in the form of a multi-position switch. Selector 71a comprises an output and a plurality of selection points pi, each connected to a resistor Ri. The first selection point p1 is connected to resistor R1 at the terminal of resistor R1 connected to the motor. The second selection point P2 is connected to resistor R2 at the terminal of resistor R2 connected to resistor R1 and so on.

Selector 71a further comprises a flip-flop 71b for connecting the output of the selector to one of selection points pi. The output of selector 71a is voltage V1 which is connected to comparison part 72. Comparison part 72 comprises a comparator whose positive input is connected to the output of selector 71a and whose negative input is connected to the gate of transistor T for activating or deactivating shock detection circuit 7. It will thus be understood that the signal applied to the gate of said transistor T is a digital signal whose voltage will be supply voltage Vdd or earth Vss and which starts the comparator.

Comparator 72b of comparison part 72 is composed of a first T1 and a second T2 n-type transistor whose gates are connected together. The source of first transistor T1 is connected to the output of selector 71a, whereas the gate of first transistor T1 is connected to its drain. The source of the second n-type transistor T2 is connected to earth and to the source of transistor T of selection part 71a.

The drains of first transistor T1 and of second transistor T2 are respectively connected to the drain of third transistor T3 and to the drain of fourth transistor T4, third transistor T3 and fourth transistor T4 being p-type transistors. The gates of transistors T3 and T4 are connected together and their drains are connected to supply voltage Vdd. Transistor T3 supplies a current I1 and transistor T4 supplies a current I2.

The comparator of the comparison part further includes a current source C1 connected in series with a fifth p-type transistor T5. The drain of fifth transistor T5 is connected to supply voltage Vdd, whereas the gate of transistor T5 is connected to its source and to the gates of transistors T3 and T4.

Transistors T3 and T4 are arranged to be identical so that current I1 is identical to current I2.

Transistors T1 and T2 are of the same dimensions and are arranged to operate in a weak inversion mode. However, transistor T2 is arranged to be placed in parallel N number of times. Transistor T2 is thus composed of a number N of parallel connected transistors.

This comparison part further comprises an AND logic gate AND1 having two inputs: a first input connected to the drain of transistor T2, whereas the second input is connected to the gate of the selection part transistor T.

In weak inversion mode, the equation for a transistor is:

$$I = Is \times e^{(Vgs/(n \times Ut))} \implies Vgs = n \times Ut \times \ln\left(\frac{I}{Is}\right)$$

Consequently, it is deduced that:

$$Vgs1 = n \times Ut \times \ln\left(\frac{I1}{Is1}\right)$$

(where n=1 or 2 depending on the technology.)

$$Vgs2 = n \times Ut \times \ln\left(\frac{\frac{I2}{N}}{Is2}\right).$$

We thus obtain:

$$V1 = Vgs2 - Vgs1 =$$

$$n \times Ut \times \left( \ln\left(\frac{\frac{I2}{N}}{Is2}\right) - \ln\left(\frac{I1}{Is1}\right) \right) = n \times Ut \times \ln((I2/N)/Is2) \times ((Is/I1))$$

Knowing that at the switching point I1=I2 et Is1=Is2, we then obtain:

$$Vref=V1=n \times Ut \times \ln(1/N) \text{ with } Ut=(k \times T)/q$$

Now, if N is greater than 1, 1/N is less than 1. Consequently, ln(1/N) is equal to −ln(N). Hence, it is understood that voltage V1 whose value is Vref is negative and shock detection circuit 7 is thus able to measure a voltage below 0V.

Depending on the position of the selector, the value Vcomp of voltage Vmot is modified by calculation unit 5, as seen in FIG. 6. The compared voltage Vcomp is calculated, at the switching point, as follows:

If the selector is in position p1, voltage Vcomp is equal to voltage V1.

If the selector is in position p2, voltage Vcomp is equal to:

$$Vcomp = Vref \times \left( \frac{R1 + R2 + R3 + R4}{R2 + R3 + R4} \right)$$

If the selector is in position p3, voltage Vcomp is equal to:

$$Vcomp = Vref \times \left( \frac{R1 + R2 + R3 + R4}{R3 + R4} \right)$$

If the selector is in position p4, voltage Vcomp is equal to:

$$Vcomp = Vref \times \left( \frac{R1 + R2 + R3 + R4}{R4} \right)$$

Consequently, the voltage at selection point P4 is higher than the voltage at selection point P1.

By way of example, the resistors could have the following values: R1=5000 Ohms, R2=3000 Ohms, R3=2000 Ohms and R4=1000 Ohms. We thus obtain Vcomp varying from V1 to 11×V1.

These values of Vref and Vcomp are then considered to be reference values.

The value of the induced voltage depends on the type of motor, on the intensity and the length of the shock. The object of this system is to measure induced voltages between 50 mV peak-peak and ~500 mV peak-peak.

In a variant visible in FIGS. 2 and 6, each motor terminal Mot1, Mot2 has a shock detection circuit 7. This variant thus allows the detection of clockwise or anticlockwise shocks.

Figure 4:
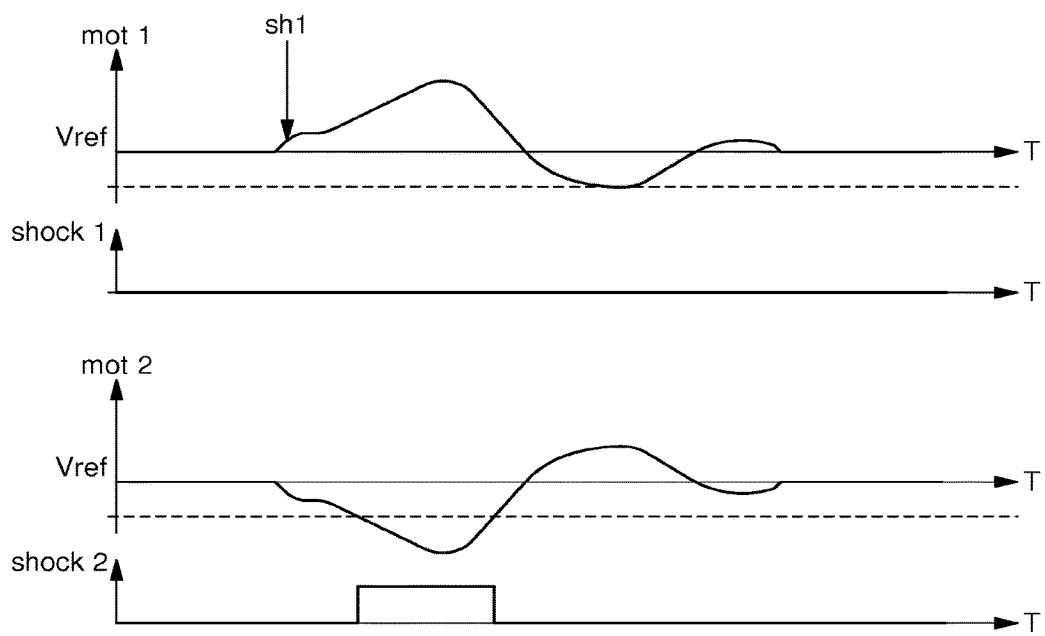
FIG. 4 represents operating diagrams for the electronic device according to the invention.

Hence the example of FIG. 4, in which each terminal Mot1, Mot2 of the motor has one shock detection circuit, each detector being configured with a negative reference voltage.

When a shock Sh1 is applied to the motor, an induced voltage is generated by the movement of the rotor of motor 4, the value of voltage Vmot thus increases.

In FIG. 4, it is noted that shock Sh1 causes the appearance of a positive induced voltage at terminal Mot1 and the appearance of a negative induced voltage at terminal Mot2. It is deduced therefrom that the shock is clockwise.

The induced voltage detected at terminal Mot1 and the voltage detected at terminal Mot2 are compared to the negative reference voltage. It is noted, in the case of FIG. 4, that the induced voltage detected at terminal Mot2 exceeds the reference threshold, i.e. it is higher than the negative reference voltage. It is thus understood here that the value of voltage V1 becomes more negative than value Vref of voltage V1 and that the value of voltage Vmot becomes more negative than value Vmot. In such case, the digital output of comparator Sh_out1 changes to 1 indicating the presence of a shock. This information is sent to calculation unit 5 which will act accordingly, for example by sending a blocking pulse to halt the rotation of the rotor. Conversely, if the value of voltage V1 does not become more negative than value Vref of voltage V1, the value of voltage Vmot does not become more negative than value Vmot, and the comparator output remains at 0.

It will be understood that the reference threshold, i.e. the reference voltage, could also be positive. In this manner, a clockwise shock will be detected via terminal Mot1, whereas an anticlockwise shock will be detected via terminal Mot2.

Figure 5:
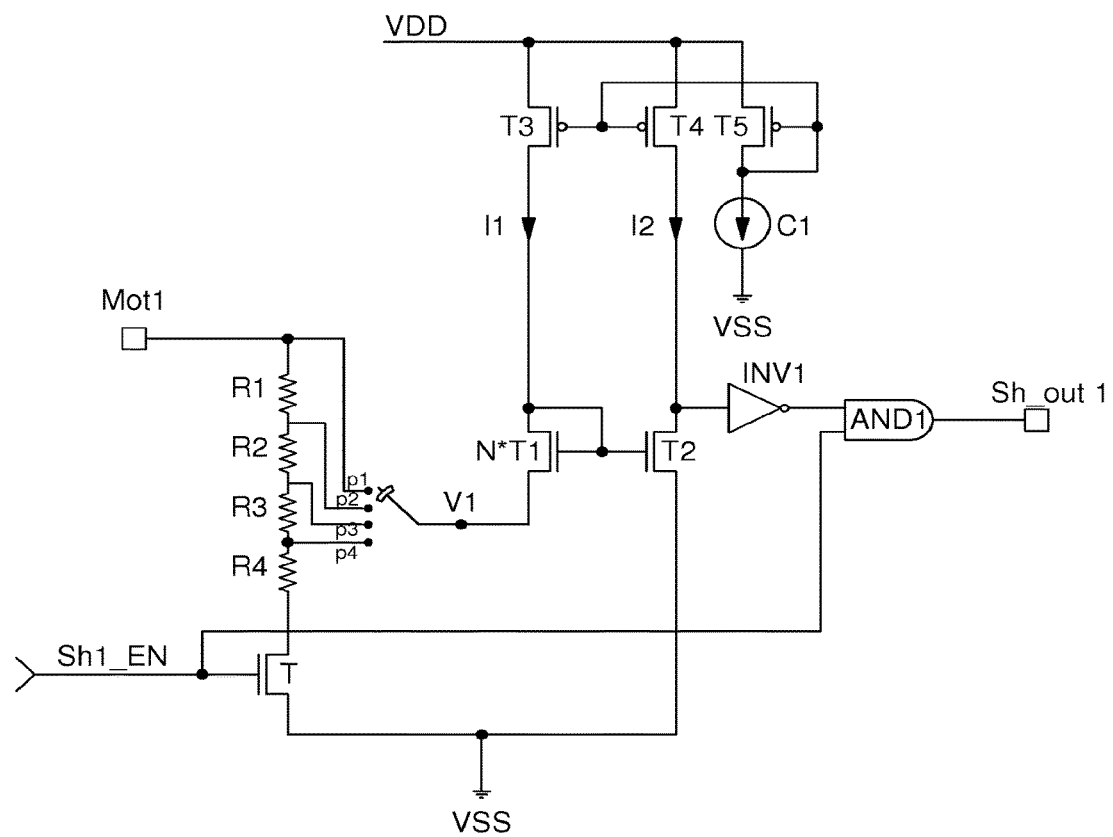

In that case, the comparator visible in FIG. 5 is digitally inverted so that if the value of voltage V1 becomes more positive than value Vref of voltage V1, the value of voltage Vmot becomes more positive than value Vmot allowing the comparator output Sh_out2 to change to 1.

It is thus noted in FIG. 5 that comparison part 72 further includes a inverter INV1 placed between transistor T2 and AND gate AND1. Further, this detection circuit 7 with a positive reference threshold is distinguished by having transistor T1 composed of a multitude of parallel connected transistors whereas transistor T2 is a single transistor.

The present invention thus allows the detection of positive or negative levels.

It will be clear that various modifications and/or improvements evident to those skilled in the art may be made to the various embodiments of the invention described in the present description without departing from the scope of the invention.

The invention claimed is:

1. An electronic device comprising:
   a calculation unit configured to generate a signal representative of a physical variable, for a motor driving a display device, the motor comprising two terminals, one positive and one negative, via which the calculation unit controls the motor;
   at least one circuit configured for shock detection connected between the calculation unit and one terminal of the motor for the detection of an external shock applied to the motor capable of moving a rotor of the motor;
   wherein the circuit configured for shock detection includes a selection part directly connected to one of the motor terminals, to vary an induced voltage generated in the motor following a shock with a movement of the rotor to improve sensitivity of the shock detector circuit, and a comparison part including a positive input and a negative input and connected to the selection part for comparing an output signal from the selection part to a predetermined reference voltage to identify a shock; and
   wherein the selection part comprises a series of series connected resistors, a first of the resistors being connected to the motor connection terminal and a last resistor of the series connected to ground;

the selection part further comprising a selector including an output connected to the positive input of the comparison part and a plurality of selection points, each connected to one resistor.

2. The electronic device according to claim 1, wherein the electronic device comprises two circuits configured for shock detection each connected between the calculation unit and one terminal of the motor for detection of an external shock applied to the motor, one circuit configured for shock detection being connected to the positive terminal whereas the other is connected to the negative terminal.

3. The electronic device according to claim 1, wherein the selection part further comprises an activation transistor in series with the series of resistors for activating or deactivating the shock detection circuit.

4. The electronic device according to claim 1, wherein the predetermined reference voltage is connected to the negative terminal of the comparison part.

5. The electronic device according to claim 1, wherein the predetermined reference voltage is negative or positive.

6. The electronic device according to claim 1, wherein the comparison part includes a first pair and a second pair of series connected transistors, each pair comprising one p-type transistor and one n-type transistor, gates of the transistors of same type being connected together, gates of the p-type transistors being connected to a current source, a gate of the n-type transistor of the first pair being connected to a drain thereof, drains of the p-type transistors being connected to a supply voltage, a source of the n-type transistor of the first pair being connected to the output of the selection part, whereas a drain of the n-type transistor of the second pair is connected to ground.

* * * * *